United States Patent [19]
Huang

[11] Patent Number: 5,943,742
[45] Date of Patent: Aug. 31, 1999

[54] STRAP TIGHTENING/LOOSENING DEVICE

[76] Inventor: Han-Ching Huang, No. 12, Alley 111, Lane 437, Chen Hsing Road, Taichung, Taiwan

[21] Appl. No.: 09/173,343

[22] Filed: Oct. 15, 1998

[51] Int. Cl.[6] ............................. A44B 21/00; B25B 25/00
[52] U.S. Cl. ........................ 24/68 CD; 24/68 R; 24/68 B
[58] Field of Search .............................. 24/68 CD, 68 R, 24/68 B, 68 D, 68 SB, 68 BT, 68 SK, 19, 909; 254/218

[56] References Cited

U.S. PATENT DOCUMENTS

| | | | |
|---|---|---|---|
| 4,199,182 | 4/1980 | Sunesson | 24/68 CD |
| 4,570,305 | 2/1986 | Smetz et al. | 24/68 CD |
| 5,560,086 | 10/1996 | Huang | 24/68 CD |
| 5,778,496 | 7/1998 | Huang | 24/68 CD |

*Primary Examiner*—Victor N. Sakran
*Attorney, Agent, or Firm*—Charles E. Baxley

[57] ABSTRACT

A strap tightening/loosening device includes two side plates with a connecting plate connected therebetween, an inverted U-shaped handle mounted to the side plates with a shaft extending through the handle and the side plates, two ratchets fixedly mounted to the shaft. Each of the two side plates has two slots and an elongated slot, two members slidably and respectively received in the two slots so that one of the members is engaged with the ratchets. A first rod is connected between the two side plates and has a limit member mounted thereto which has two hooks and two tail members extending therefrom. Two slidable plates are connected to the two side plates with a second rod extending through the elongated slots and the slidable plates. The two hooks are disengagably engaged with the second rod. The first rod together with the two hooks are pivoted by an impact of one of the members which is pushed by the cam device defined in each of the distal ends of the handle.

8 Claims, 8 Drawing Sheets

STRAP TIGHTENING/LOOSENING DEVICE

FIELD OF THE INVENTION

The present invention relates to a strapping device, and more particularly, to a strap tightening/loosening device having a limit member pivotally connected between two side plates of the device and disengagably engaged with a movable rod which is pulled by the strap and moved for a short distance when the limit member is disengaged from the movable rod.

BACKGROUND OF THE INVENTION

Strapping devices are used to wrap piles of boxes in a truck, for example, tightly so that the piles of boxes are maintained in a stable status which is benefit when transportation. In order to ensure the piles of boxes will not fall downwardly when the strap is loosened, the operators have to check the piles of boxes to prevent the higher portion of the piles of boxes from suddenly falling to injure the operators so that the conventional strapping devices are developed to have the function of loosening the strap slightly and still holding the boxes if the strapping devices are not operated to loosen the straps completely. Two known strapping device having such function are disclosed applicant's U.S. Pat. No. 5,778,496 issued on Jul. 14, 1998 and U.S. patent application Ser. No. 08/901,758, filed on Jul. 28, 1997 which is under the procedure of issuance. Both the two strapping devices resolve the problems described above, However, a movable frame in each of the two strapping devices is pulled by springs so that once the force of the strap is disappeared, the frame will be pulled backward quickly without any warning. The hand of an operator having no long-term experience could be clamped by the sudden moving frame.

The present invention provides a strap tightening/loosening device having a limit member which is disengaged with the movable rod of the frame which is not pulled by springs so that the frame will not injure the operators when the strap is completely loosened.

SUMMARY OF THE INVENTION

In accordance with one aspect of the present invention, there is provided a strap tightening/loosening device comprising two side plates with a connecting plate connected between the two side plates with a stop extending from the connecting plate. Each of the two side plates has a first slot and a second slot defined therethrough, and a first elongated slot defined therethrough between the first end of the side plate and the first slot and the second slot corresponding thereto. Each of the two side plates has a first aperture defined between the first elongated slot and the first slot. A first rod extends through the two first apertures of the two side plates and a limit member is fixedly mounted to the first rod. The limit member has two hooks extending radially outward therefrom and two tail members extend in opposite to the hooks therefrom. Two coil springs are respectively connected between the two tail members and the two second ends of the side plates. Each of the two second ends of the two side plates has a first notch and a second notch defined in the periphery thereof.

An inverted U-shaped handle is mounted to the two respective second ends of the two side plates. A shaft rotatably extends through the two respective second ends of the two side plates and is fixedly connected to the two distal ends of the handle. Two ratchets are fixedly mounted to the shaft and respectively located between the side plates and the distal ends of the handle. An actuating member is slidably and biasedly connected to the handle and engaged with the two ratchets.

A first member is movably received in the two first slots and has two first pawls engaged with the two ratchets, a second member movably received in the two second slots and having two second pawls. The first member and the second member are respectively and biasedly connected to the stop of the connecting member.

Two slidable plates each have a second elongated slot, a first hole and a second hole respectively defined therethrough. The first hole and the second hole are located on the two ends of the second elongated slot corresponding thereto. The two slidable plates are respectively and movably connected to the two side plates with a second rod extending through the two second holes and the first elongated slots. The two hooks are disengagably engaged with the second rod. The two second pawls of the second member are pushed by the two distal ends of the handle by rotating the handle to push the two tail members to pivot the limit member to disengage the two hooks from the second rod.

It is an object of the present invention to provide a strap tightening/loosening device wherein the slidable frame is limited by two hooks and has no springs connected thereto so that the slidable frame is engaged with the hooks again by hands.

Further objects, advantages, and features of the present invention will become apparent from the following detailed description with appropriate reference to the accompanying drawings.

DETAILED DESCRIPTION OF THE PREFERRED EMBODIMENT

Figure 1:
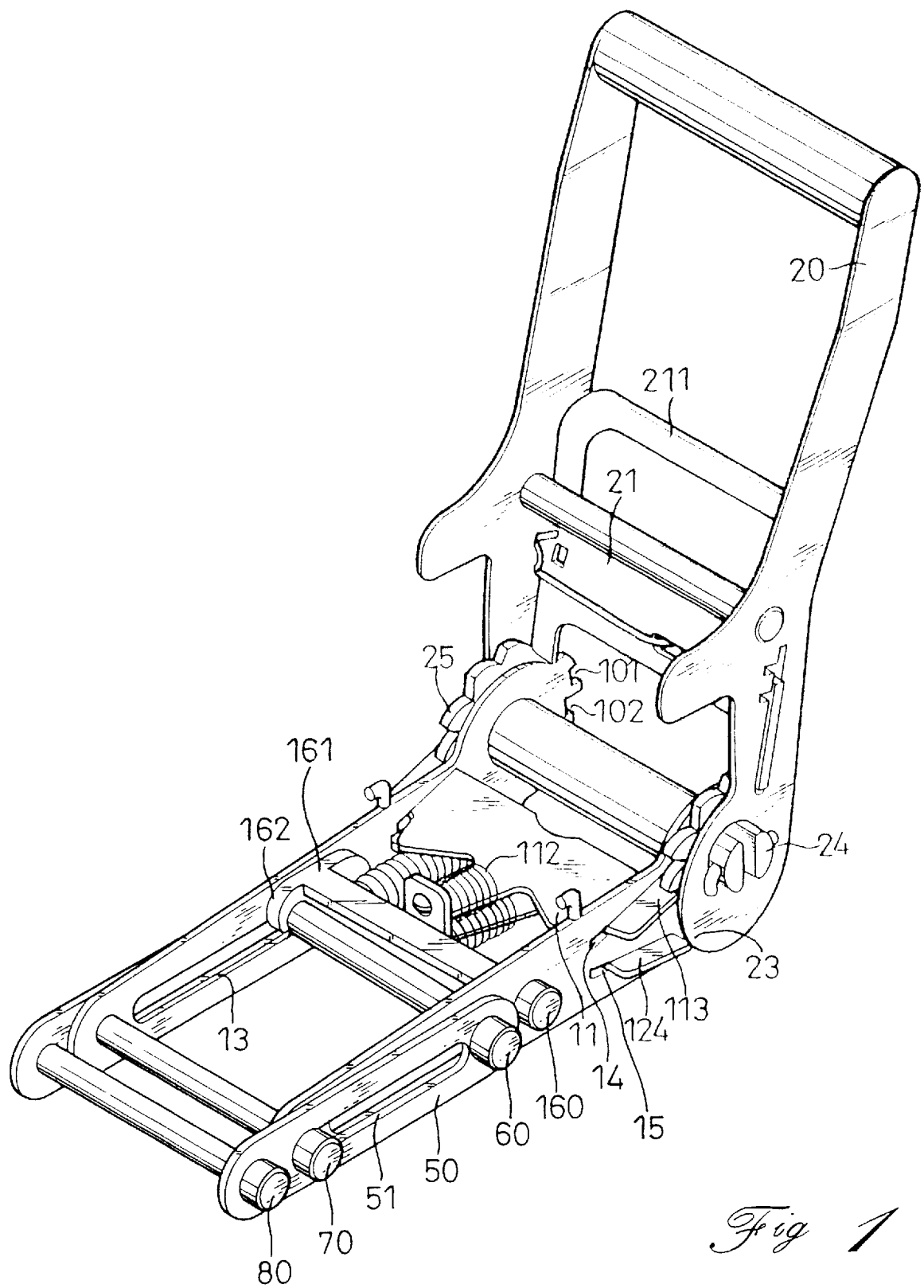
FIG. 1 is an perspective view of the strap tightening/loosening device in accordance with the present invention.
Figure 2:
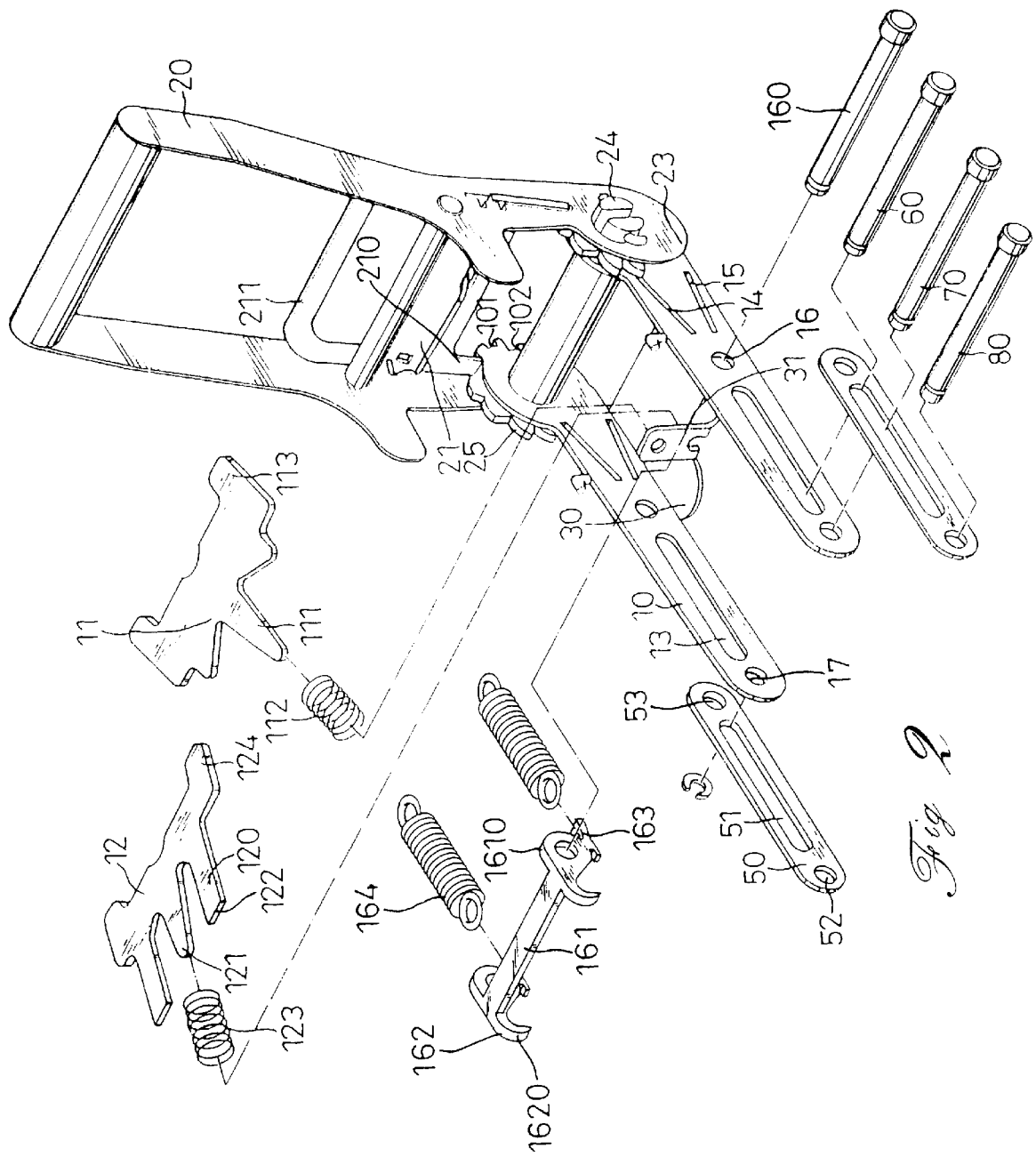
FIG. 2 is an exploded view of the strap tightening/loosening device in accordance with the present invention.
Figure 3:
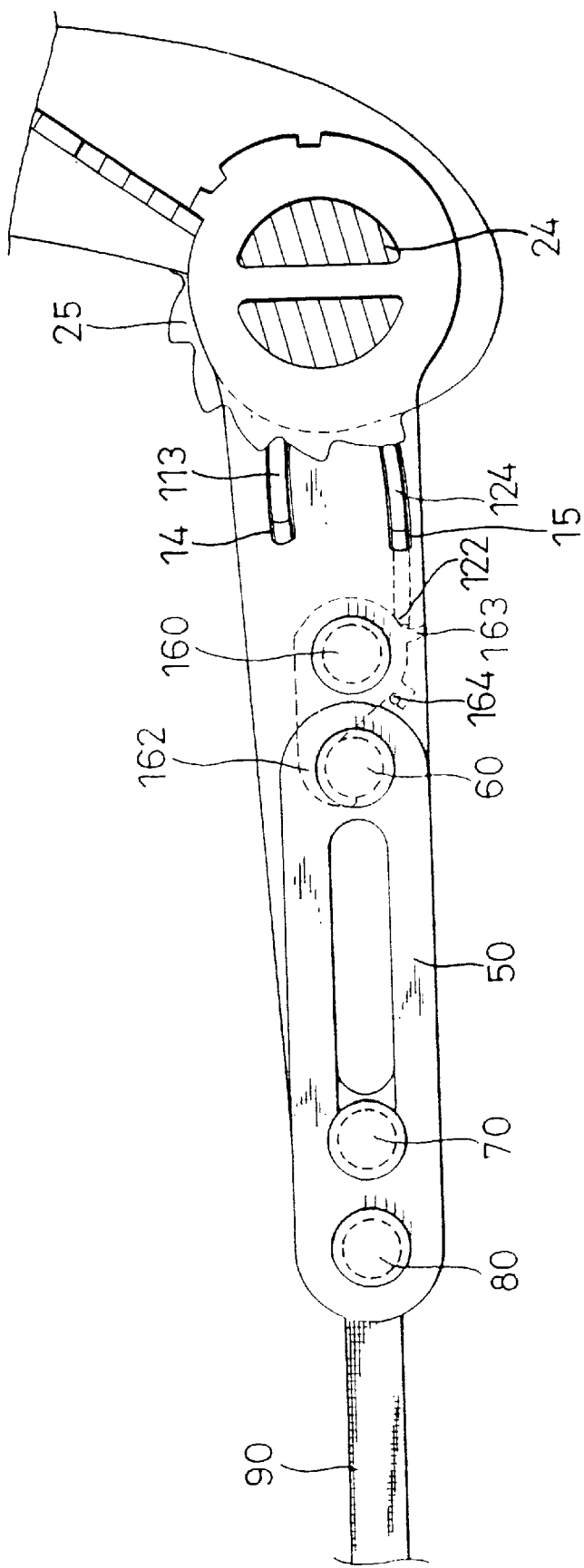
FIG. 3 is a side elevational view, partly in section, of the strap tightening/loosening device in accordance with the present invention, wherein the actuating member is engaged with the ratchets (only one is shown)

Referring to FIGS. 1 to 3, the strap tightening/loosening device in accordance with the present invention comprises two side plates 10 each having a first end and a second end, a connecting plate 30 connected between the two side plates with a stop 31 extending therefrom. Each of the two side plates 10 has a first slot 14 and a second slot 15 defined therethrough and both of the two slots 14, 15 are located near the second end of the side plate 10 corresponding thereto. Each of the two side plates 10 has a first elongated slot 13 defined therethrough which is located between the first end of the side plate 10 and the first slot 14 and the second slot 15 corresponding thereto. Each of the second slots 15 is inclined to the longitudinal axis of the side plates 10 corresponding thereto, wherein the periphery defining each of the second slots 15 has a first end thereof higher than a second end thereof which is located near the handle 20. Each of the two side plates 10 has a first aperture 16 defined between the first elongated slot 13 and the first slot 14. A first rod 160 extends through the two first apertures 16 of the two side plates 10 and a limit member 161 is mounted to the first rod 160. The limit member 161 has two rings 1610 mounted to the first rod 160 and each of the two rings 1610 has a hook 162 and a tail member 163 respectively extending radially outward therefrom. Each of the hooks 162 has an inclined surface 1620 defined in an outer periphery thereof and the two tail members 163 extend in opposite to the hooks 162. Two coil springs 164 are respectively connected between the two tail members 163 and the two second ends of the side plates 10 so that the two hooks 162 are normally pressed downwardly. Each of the two second ends of the two side plates 10 has a first notch 101 and a second notch 102 defined in the periphery thereof. Each of the first end of the two side plates 10 has a second aperture 17 defined therethrough An inverted U-shaped handle 20 is mounted to the two respective second ends of the two side plates 10 and a shaft 24 rotatably extends through the two respective second ends of the two side plates 10 and fixedly connected to the two distal ends of the handle 20. Two ratchets 25 are fixedly mounted to the shaft 24 and respectively located between the side plates 10 and the distal ends of the handle 20 so that one end of a strap (not sown) is fixedly wrapped to the shaft 24. An actuating member 21 is slidably and biasedly connected to the handle 20 and has an operation handle 211 and is engaged with the two ratchets 25 by two legs 210 so that when pulling the operation handle 211 upwardly, the two legs 210 are disengaged from the ratchets 25.

A first member 11 is movably received in the two first slots 14 and has two first pawls 113 engaged with the two ratchets 25, a second member 12 movably received in the two second slots 15 and having two second pawls 124. Each of the two distal ends of the handle 20 has a cam means 23 formed thereto so as to push the two second pawls 124 of the second member 12 when pivoting the handle 20. The first member 11 has a first neck 111 extending therefrom and a spring 112 is mounted to the first neck 111 and biased between the first neck 111 and the stop 31. The second member 12 has a second neck 121 extending therefrom and a spring 123 is mounted to the second neck 121 and biased between the second neck 121 and the stop 31.

A slidable frame composed of two slidable plates 50 and each of the two slidable plates 50 has a second elongated slot 51. A first hole 52 and a second hole 53 are respectively defined through each of the two slidable plates 50 and located on the two ends of the second elongated slot 51 corresponding thereto. The two slidable plates 50 are respectively and movably connected to the two side plates 10 with a second rod 60 extending through the two second holes 53 and the first elongated slots 13. The two hooks 162 are disengagably engaged with the second rod 60. A third rod 70 extends through the two second elongated slots 51 of the two slidable plates 50 and the two second apertures 17. A fourth rod 80 extends through the two first holes 52 of the two slidable plates 50 so as to form a movable frame composed of the two slidable plates 50, the second rod 60 and the fourth rod 80 to which the other end of the strap 90 (FIG. 6) is securely mounted.

Figure 4:
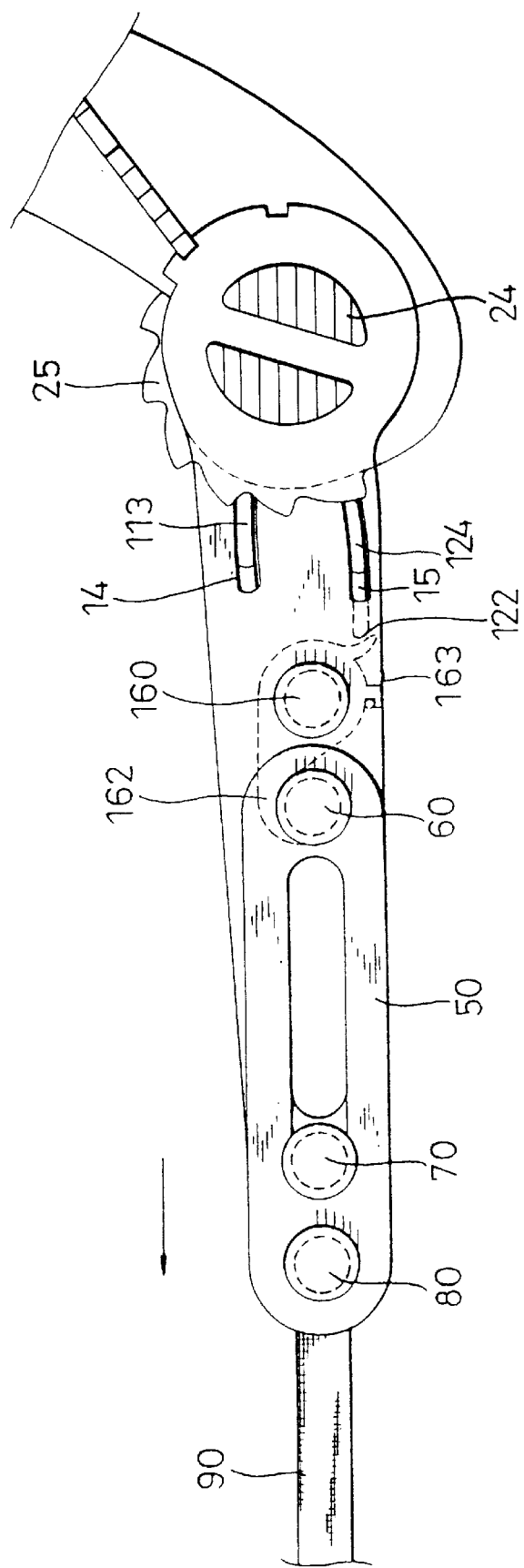
FIG. 4 is a side elevational view, partly in section, of the strap tightening/loosening device in accordance with the present invention, wherein the actuating member is pivoted to engage with the first notches (only one is shown)
Figure 6:
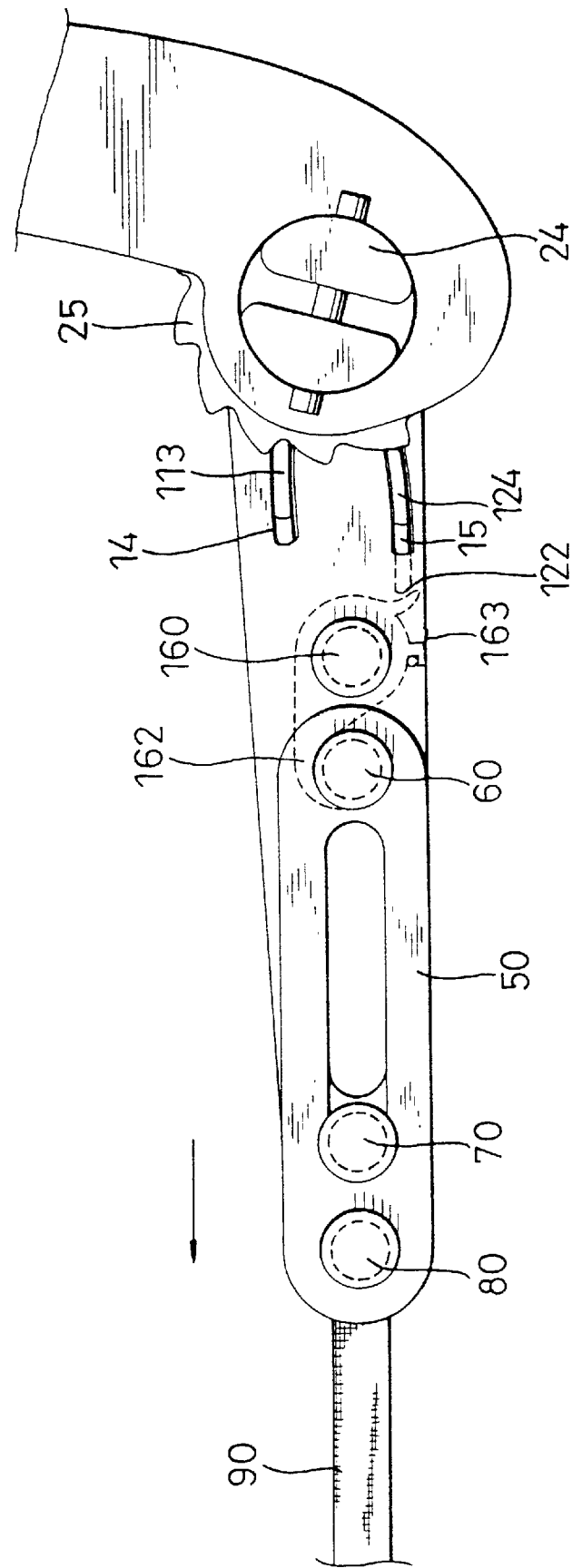
FIG. 6 is a side elevational view, partly in section, of the strap tightening/loosening device in accordance with the present invention, wherein the hooks are pivoted to disengage from the second rod.
Figure 7:
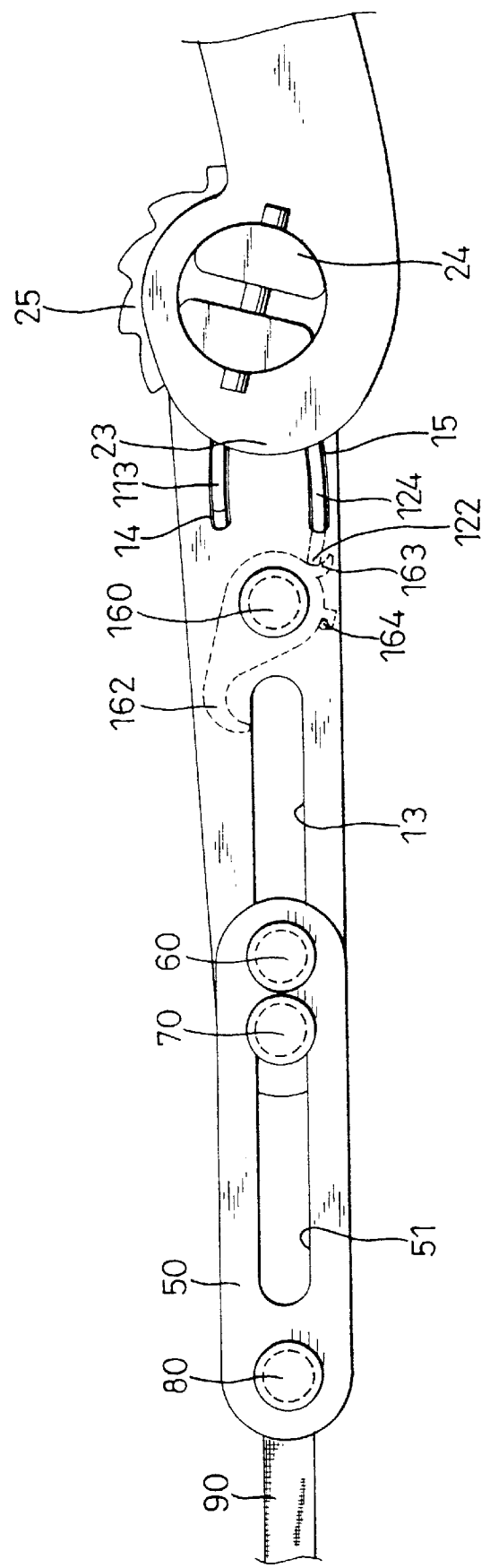
FIG. 7 is a side elevational view, partly in section, of the strap tightening/loosening device in accordance with the present invention, wherein the two slidable plates and the second rod are pulled to a short distance within the first elongated slots of the two side plates by rotating the cam means of the handle.

When checking the piles of boxes in the truck by the device, the two legs 210 are removed to be received in the first notch 101 by pivoting the handle 20 as shown in FIG. 4. Referring to FIGS. 6 and 7, when the handle 20 is so pivoted, the cam means 23 of the handle 20 push the two second pawls 124 of the second member 12 to let the two front ends 122 of the pushing branches 120 of the second member 12 impact the tail members 163 so that the hooks 162 are pivoted to disengage from the second rod 60. Once the second rod 60 is not limited by the two hooks 162, the tension force in the strap 90 will pull the fourth rod 80 together with the slidable frame till the second rod 60 is stopped by the inner periphery defining each of the two first elongated slots 13.

Figure 5:
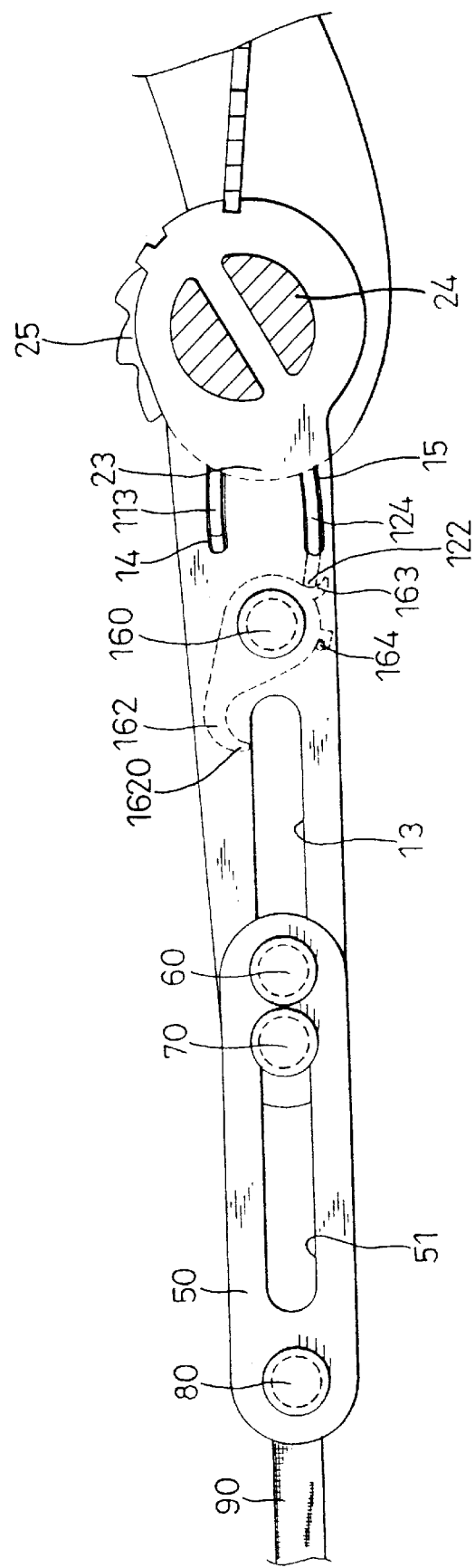
FIG. 5 is a side elevational view, partly in section, of the strap tightening/loosening device in accordance with the present invention, wherein the actuating member is pivoted to engage with the second notches (only one is shown)
Figure 8:
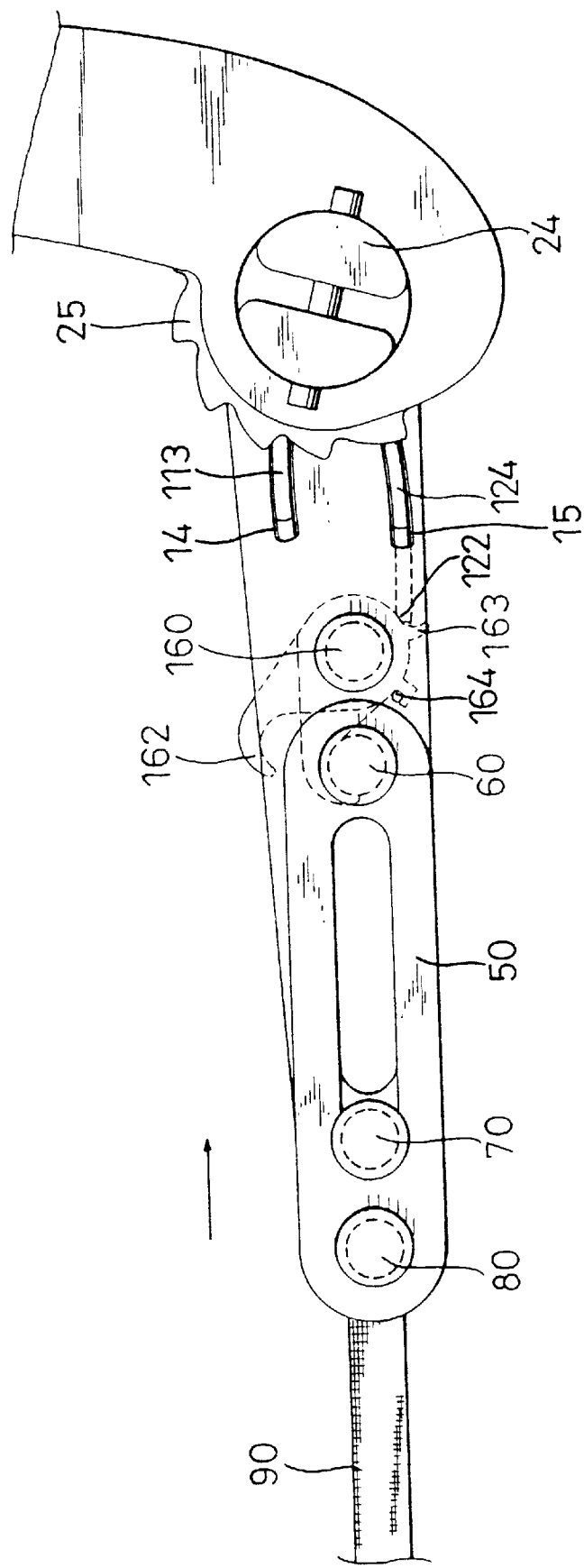
FIG. 8 is an illustrative view to illustrate the hooks are engaged with the second rod again by moving the second rod to impact the two hooks.

Referring to FIG. 5, if the pile boxes has been checked, the two legs 210 are then further moved to be received in the second notches 102 and the shaft 24 can be rotated freely to loosen the strap 90. Referring to FIG. 8, the movable frame is then able to be move backward to let the second rod 60 hit the inclined surfaces 1620 of the two hooks 162, the two hooks 162 are then pivoted to engage the second rod 60 again.

The invention is not limited to the above embodiment but various modification thereof may be made. It will be understood by those skilled in the art that various changes in form and detail may made without departing from the scope and spirit of the present invention.

What is claimed is:

1. A strap tightening/loosening device comprising:

two side plates each having a first end and a second end, a connecting plate connected between said two side plates with a stop extending therefrom, each of said two side plates having a first slot and a second slot defined therethrough and located near said second end of said side plate corresponding thereto, each of said two side plates having a first elongated slot defined therethrough and located between said first end of said side plate and said first slot and said second slot corresponding thereto, each of said two side plates having a first aperture defined between said first elongated slot and said first slot, a first rod extending through said two first apertures of said two side plates and a limit member mounted to said first rod, said limit member having two hooks extending radially outward therefrom and two tail members extending in opposite to said hooks, two coil springs respectively connected between said two tail members and said two second ends of said side plates so that said two hooks are normally pressed downwardly, each of said two second ends of said two side plates having a first notch and a second notch defined in the periphery thereof;

an inverted U-shaped handle mounted to said two respective second ends of said two side plates, a shaft rotatably extending through said two respective second ends of said two side plates and fixedly connected to the two distal ends of said handle, two ratchets fixedly mounted to said shaft and respectively located between said side plates and the distal ends of said handle, an actuating member slidably and biasedly connected to said handle and engaged with said two ratchets;

a first member movably received in said two first slots and having two first pawls engaged with said two ratchets, a second member movably received in said two second slots and having two second pawls, said first member and said second member respectively and biasedly connected to said stop of said connecting member;

two slidable plates each having a second elongated slot, a first hole and a second hole respectively defined through each of said two slidable plates and located on the two ends of said second elongated slot corresponding thereto, said two slidable plates respectively and movably connected to said two side plates with a second rod extending through said two second holes and said first elongated slots, said two hooks disengagably engaged with said second rod, said two second pawls of said second member being pushed by said two distal ends of said handle by rotating said handle to push said two tail members to pivot said limit member to disengage said two hooks from said second rod.

2. The strapping device as claimed in claim 1, wherein each of said first end of said two side plates has a second aperture defined therethrough and a third rod extends through said two second elongated slots of said two slidable plates and said two second apertures.

3. The strapping device as claimed in claim 1, wherein each of the two distal ends of said handle has a cam means formed thereto so as to push said two second pawls of said second member.

4. The strapping device as claimed in claim 1, wherein each of said second slots is inclined to the longitudinal axis of said side plates corresponding thereto, wherein the periphery defining each of said second slots has a first end thereof higher than a second end thereof which is located near said handle.

5. The strapping device as claimed in claim 1, wherein said first member has a first neck extending therefrom and a spring is mounted to said first neck and biased between said first neck and said stop, said second member has a second neck extending therefrom and a spring is mounted to said second neck and biased between said second neck and said stop.

6. The strapping device as claimed in claim 1, wherein said limit member has two rings mounted to said first rod and said hooks and said tail members are respectively extending radially outward from said two rings.

7. The strapping device as claimed in claim 1, wherein each of said hooks has an inclined surface defined in an outer periphery thereof so that said two hooks are pivoted when said second rod returns back to impact said inclined surfaces of said two hooks.

8. The strapping device as claimed in claim 1 further comprising a fourth rod extending through said two first holes of said two slidable plates.

* * * * *